No. 659,462. Patented Oct. 9, 1900.
H. F. WEEKS.
BALL BEARING.
(Application filed June 12, 1900.)
(No Model.)
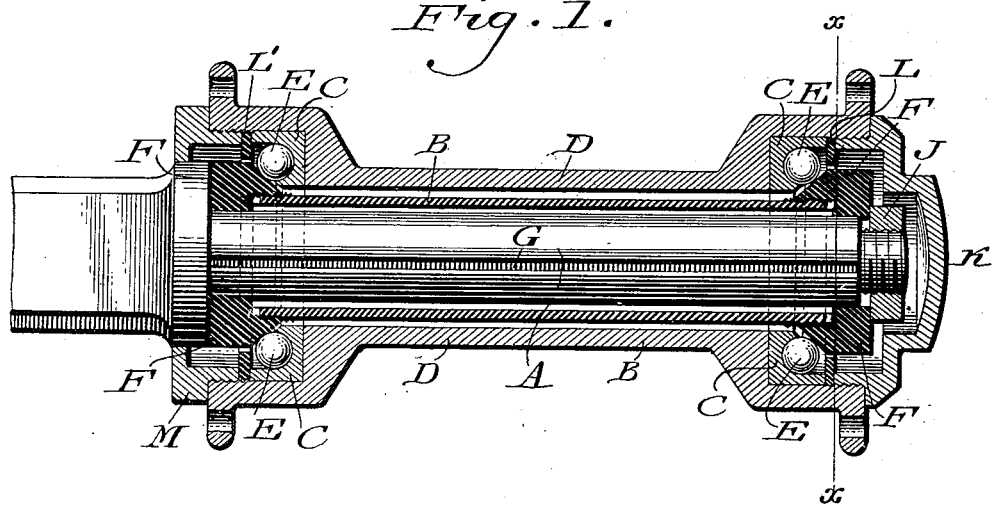
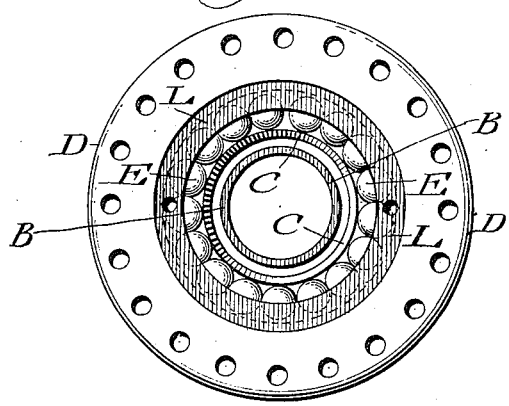
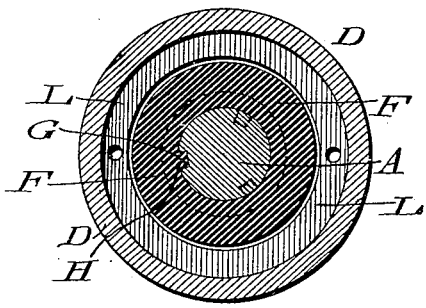
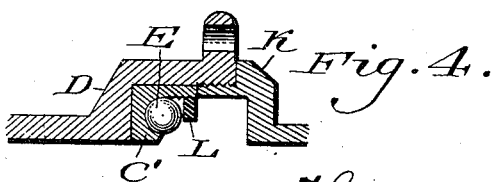
Witnesses
P. F. Nagle.
L. Douville.
Inventor
Hubbard F. Weeks
By Diedersheim & Fairbanks
Attorneys

UNITED STATES PATENT OFFICE.

HUBBARD F. WEEKS, OF FREEHOLD, NEW JERSEY, ASSIGNOR OF TWO-THIRDS TO RULIEF P. SMOCK AND FRANK C. DU BOIS, OF SAME PLACE.

BALL-BEARING.

SPECIFICATION forming part of Letters Patent No. 659,462, dated October 9, 1900.

Application filed June 12, 1900. Serial No. 20,042. (No model.)

*To all whom it may concern:*

Be it known that I, HUBBARD F. WEEKS, a citizen of the United States, residing at Freehold, in the county of Monmouth and State of New Jersey, have invented a new and useful Improvement in Ball-Bearings for Bicycles or other Vehicles, which improvement is fully set forth in the following specification and accompanying drawings.

My invention consists of a ball-bearing for a bicycle or other vehicle embodying a sleeve which encircles the journal or axle and provides the means for adjusting the cone of the bearing with relation to the balls thereof, said cone being also interlocked with said journal or axle, whereby it is prevented from rotating, thus also preventing rotation of said sleeve.

Figure 1 represents a longitudinal section of a ball-bearing embodying my invention. Fig. 2 represents an end view thereof, certain parts having been removed. Fig. 3 represents a section on line $xx$, Fig. 1. Fig. 4 represents a section of a modification.

Similar letters of reference indicate corresponding parts in the figures.

Referring to the drawings, A designates a journal or axle, and B designates a sleeve encircling the same.

C designates the cups fitted, as usual, in the ends of the hub D and forming the seats for the balls E.

F designates the cones, which are internally threaded and adapted to be screwed on the ends of the sleeve B and adjusted so as to properly have the balls E rest thereagainst.

On the journal or axle A is the longitudinally-extending groove G, and on the interior of the cones are the tongues H, which are adapted to enter said groove, whereby rotation of the cones, and consequently of the sleeve B, is prevented.

The operation is as follows: When the wheel rotates, the balls form the bearing therefor on the cups C and cones F, as usual in said cases; but owing to said sleeve and the threaded connection of the cones therewith the latter may be adjusted with reference to the balls E as to occasion the proper pressure on the latter and take up the lost motion and provide for the wear of the contiguous parts. When the cones are properly adjusted, the nut J is applied to the stub on the end of the journal and tightens against the outer cone, thus preventing disarrangement of the adjustment. The end caps K and M are employed for purposes usual in such cases. In order to prevent the displacement of the balls E when the cones and sleeve are removed, I employ the retainers L L', which are screwed to the interior of the end portions of the hub D and adapted to be tightened against the cups C. In this case the threads on the interior of said ends of the hub are common in one case to the outer cap K and adjacent retainer L and the inner cap M and adjacent retainer L'. In Fig. 4 I show a retainer L as screwed directly to the adjacent cup C'. In either case the necks of the caps enter the hub to the rings L L' and prevent unscrewing of the latter or change in the adjustment thereof.

A plurality of tongues H and grooves G may be employed, as shown in dotted lines, Fig. 3.

Having thus described my invention, what I claim as new, and desire to secure by Letters Patent, is—

1. In a ball-bearing for a bicycle or other vehicle, a sleeve interposed between the journal of the vehicle and the hub of the wheel thereon, the cone of the bearing being connected with said sleeve in combination with means for interlocking the cone with the journal for preventing rotation of said cone.

2. In a ball-bearing for a bicycle or other vehicle, a sleeve encircling the journal or axle, and a cone adjustably connected with said sleeve, the balls of the bearing being interposed between the cup in the hub and said cone in combination with means for interlocking the cone with the journal for preventing rotation of said cone.

3. In a ball-bearing for a bicycle or other vehicle, a sleeve encircling the journal or axle, a bearing-cone connected with said sleeve, and means for interlocking said cone with said journal or axle for preventing rotation of said cone.

4. In a ball-bearing for a bicycle or other vehicle, a sleeve encircling the journal or axle, a bearing-cone connected with said sleeve, and a tongue on said cone, the journal having a longitudinally-extending groove to receive said tongue for preventing the rotation of the cone.

5. In a ball-bearing for a bicycle or other vehicle, a hub, an axle, a sleeve around said axle, a cup seated in said hub, a cone connected with said sleeve, balls between said cup and cone, a screw-threaded retainer for said balls in said hub, a closing-cap having its neck entering said hub and engaging said retainer for preventing unscrewing of the same, there being a tongue and groove on said cone and axle, respectively for interlocking the latter-named parts and preventing rotation of the cone and consequently of the sleeve.

HUBBARD F. WEEKS.

Witnesses:
   F. C. Du Bois,
   H. M. Emmons.